(12) United States Patent
Singh et al.

(10) Patent No.: US 11,928,689 B2
(45) Date of Patent: Mar. 12, 2024

(54) DELETING TRANSACTIONS FROM A DISTRIBUTED LEDGER

(71) Applicant: Siemens Aktiengesellschaft, Munich (DE)

(72) Inventors: Saurabh Narayan Singh, Bayern (DE); Nejc Zupan, Munich (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 18/134,996

(22) Filed: Apr. 14, 2023

(65) Prior Publication Data

US 2023/0342785 A1 Oct. 26, 2023

(30) Foreign Application Priority Data

Apr. 21, 2022 (EP) .................................... 22169268

(51) Int. Cl.
| | | |
|---|---|---|
| *G06F 16/00* | (2019.01) | |
| *G06F 16/215* | (2019.01) | |
| *G06F 16/23* | (2019.01) | |
| *G06Q 20/40* | (2012.01) | |
| *G06F 21/64* | (2013.01) | |

(52) U.S. Cl.
CPC ......... *G06Q 20/407* (2013.01); *G06F 16/215* (2019.01); *G06F 16/2365* (2019.01); *G06F 21/64* (2013.01)

(58) Field of Classification Search
None
See application file for complete search history.

(56) References Cited

U.S. PATENT DOCUMENTS

| | | | | |
|---|---|---|---|---|
| 2019/0019188 | A1* | 1/2019 | Leidner | ................. G06Q 20/06 |
| 2019/0361917 | A1* | 11/2019 | Tran | .................... H04W 12/108 |
| 2023/0129559 | A1* | 4/2023 | Higgins | ................ H04L 9/3297 |
| | | | | 707/703 |

OTHER PUBLICATIONS

Korean Application as hereinafter KR-NPL, "Distributed Computing Resources Sharing System and Computing Apparatus Thereof Based on Block Chain System Supporting Smart Contract", May 28, 2020, 13 pages. (Year: 2020).*
Akm Bahalul Haque et al: "GDPR Compliant Blockchains—A Systematic Literature Review", arxiv.org, Cornell University Library, 201 Olin Library Cornell University Ithaca, NY 14853, Apr. 1, 2021 (Apr. 1, 2021), XP081931540, DOI: 10.1109/access.2021.3069877.
Buterin Vitalik: "Ethereum: A Next-Generation Smart Contract and Decentralized Application Platform", Technical Fields Searched (IPC) , Jan. 1, 2014 (Jan. 1, 2014), pp. 1-36, XP055968745, Retrieved from the Internet: URL:https:/ethereum.org/669c9e2e2027310b6b3cdce6elc52962/Ethereum_Whitepaper_-_Buterin_2014.pdf [retrieved on Oct. 6, 2022].

(Continued)

*Primary Examiner* — Bai D Vu
(74) *Attorney, Agent, or Firm* — Schmeiser, Olsen & Watts LLP (57) ABSTRACT

Various examples of the disclosure generally pertain to storing, in a distributed ledger and in association with one or more transactions, one or more identifiers of owners of respective smart contracts. Various examples of the disclosure relate to deleting transactions associated with a given party as owner upon receiving a withdrawal request of the given party.

12 Claims, 3 Drawing Sheets

(56) References Cited

OTHER PUBLICATIONS

Needham Roger M et al: "Using encryption for authentication in large networks of computers", ACM: Communications of the ACM, vol. 21, No. 12, Dec. 1978, XP058231706; 1978.
Politou Eugenia et al: "Blockchain Mutability: Challenges and Proposed Solutions", IEEE Transactions on Emerging Topics in Computing, IEEE, USA, vol. 9, No. 4, Oct. 25, 2019 (Oct. 25, 2019), pp. 1972-1986, XP011891274, DOI: 10.1109/TETC.2019. 2949510, retrieved on Dec. 2, 2021].
Baird Leemon: "The Swirlds Hashgraph Consensus Algorithm: Fair, Fast, Byzantine Fault Tolerance", Swirlds Tech Report SWIRLDS-TR-2016-01; 2016.
Antonopoulos Andreas M: "Mastering Bitcoin: Unlocking Digital Cryptocurrencies"★ Reilly, First edition discloses at section Transaction Age, Fees, and Priority, 2014; 2014.
Diedrich, Henning "Ethereum: Blockchains, Digital Assets, Smart Contracts, Decentralized Autonomous Organizations" CreateSpace Independent Publishing Platform, Sep. 8, 2016 // ISBN-10: 1523930470 // ISBN-13: 978-1523930470.
GitHub/ "The Ethereum Book Project/Mastering Ethereum" https:// github.com/ethereumbook/ethereumbook, Stand May 10, 2017; 2017.
BlockchainHub: "Blockchain Oracles", https://blockchainhub.net/ blockchain-oracles/; 2018.
Anderson Ross: "Security Engineering. A Guide to Building Dependable Distributed Systems"; Wiley; Jan. 2001; 2001.
Baird Leemon: "Overview of Swirlds Hashgraph", Swirlds; 2016.

* cited by examiner

DELETING TRANSACTIONS FROM A DISTRIBUTED LEDGER

CROSS-REFERENCE TO RELATED APPLICATIONS

This application claims priority to EP Application No. 22169268.4, having a filing date of Apr. 21, 2022, the entire contents of which are hereby incorporated by reference.

FIELD OF TECHNOLOGY

The following relates to operating a node of a network of nodes that maintains a distributed ledger such as a blockchain. The following specifically relates to a data structure and an associated protocol that facilitates deleting transactions from the distributed ledger if an associated party intends to leave a consortium operating the network.

BACKGROUND

Blockchain applications store the data in a decentralized manner. A blockchain is an example implementation of a distributed ledger that is stored in a replicated manner across multiple nodes of a respective network.

This allows decentralized governance and monitoring of transactions associated with the data (smart contracts), where an individual entity cannot make changes to the transactions in an unrestricted malicious manner.

Even if the state of a smart contract is updated to be deleted, all the previous versions of the smart contract still exist in the distributed ledger in form of respective transactions and various states can be verified by performing the set of transactions on the original state of the smart contract.

In essence, the entire lifecycle of the data is stored, is accessible, and can be monitored. This introduces the high-level trust promises that a blockchain provides over traditional centralized databases.

Nonetheless, such techniques face certain restrictions and drawbacks. For example, a blockchain application can have multiple participants (consortium of parties). If each party brings in their own data when they participate in the application, this data is stored on the blockchain that is replicated across multiple nodes of the respective network. If, at some point in time, a given party wants to leave the blockchain application (leave the consortium), its data is still stored on the blockchain. According to reference implementations, this data can neither be deleted, nor truly be access-restricted as it is replicated across multiple nodes.

This leads to high difficulty and complexity when it comes to designing a blockchain application, since it requires that the parties of the consortium to be constantly aware of which data is stored in the distributed ledger, which data is stored using alternate means (i.e., not included in the distributed ledger), how to provide same level of data provenance and security promises to the data stored elsewhere, and how to make sure that the data stored in the distributed ledger does not reveal the information related to the data stored elsewhere. It is a challenge to understand and define all these requirements at the time of design of the application, since the policies cannot be changed retrospectively.

SUMMARY

Accordingly, a need exists for advanced techniques of operating nodes of a network of notes that is maintaining a distributed ledger of smart contracts amongst a consortium of parties. Specifically, a need exists for advanced techniques that mitigate the above-identified restrictions and drawbacks.

According to examples disclosed herein, protocols for execution and nodes of a network of nodes that is maintaining a distributed ledger are disclosed. Such protocol enables storage of data, specifically of transactions associated with smart contracts, in an efficient manner in a distributed ledger that is maintained by the network of nodes.

The multiple nodes are operated by parties of a consortium of parties.

The multiple nodes can implement a distributed database system (DBS).

According to various examples, each transaction can be associated with a respective smart contract which is, in turn, associated with a given party of the consortium of parties that owns the smart contract. In other words, each transaction can be associated with a respective owner. Each transaction can be tagged to the respective party that owns the associated smart contract. One or more respective identifiers can be stored in association with those transactions stored in the distributed ledger.

These identifiers facilitate deleting of transactions from the distributed ledger in case a party intends to leave the consortium. Once a given party intends to leave the consortium, it is possible to delete such transactions from the distributed ledger that are associated with the given party as owner, by taking into account the identifiers.

This may be in accordance with data retention rules associated with the smart contract and specifying consensus requirements amongst the plurality of parties for the case of the given party intending to leave the consortium.

Unless explicitly stated otherwise the terms "perform", "calculate", "computer-implemented", "calculate", "establish", "generate", "configure", "reconstruct" and the like relate to actions and/or processes and/or processing steps which modify data and/or which generate data and/or which transform data in other data. Data can be represented by physical quantities or be present as physical quantities, e.g., as electrical pulses. In particular, the term "computer" should be interpreted broadly to cover all electronic devices having data processing capabilities. Computers can, thus, be implemented by personal computers, servers, memory programmable controllers, handheld computer systems, pocket PC devices, wireless communication devices and other communication devices that can process data, processors and other electronic devices for processing data.

In the context of the present disclosure "computer-implemented" can relate to an implementation of a method in which a processor performs at least one method step.

A processor in the context of the present disclosure can be a machine or electronic circuit. A processor can be specifically implemented by a central processing unit (CPU) or a microprocessor or a microcontroller, e.g., an application-specific integrated circuit (ASIC) or a digital signal processor, possibly in combination with a memory unit for storing program code, etc. A processor can alternatively or additionally be implemented by an integrated circuit (IC), specifically a field programmable gate array (FPGA), an ASIC or a digital signal processor (DSP) or a graphic processing unit (GPU). Alternatively or additionally, a processor can be implemented by a virtual processor or a virtual machine or a soft CPU. A processor can be implemented by a programmable processor having configuration interfaces that facilitate configuration of various techniques described herein. The programmable processor can be configured to implement method steps as described herein, components, modules, or other aspects of the techniques described herein.

A "memory unit" or "memory module" or the like can be implemented by a volatile memory in the form of random access memory (RAM) or a non-volatile memory such as a hard disc or data carrier.

A "module", in the context of the present disclosure, can be implemented by a processor and/or a memory unit for storing program instructions. A module can be implemented in hardware and/or software and/or firmware. For example, the processor can be configured to execute the program instructions such that the processor executes functions that implement methods or steps of a method as described herein. A module can also be a node of a DBS that implements specific functions/features of the respective module. The respective modules can, e.g., be implemented as separate/individual modules. For this, the respective modules can include further elements. For example, these further elements can be one or more interfaces (e.g., database interfaces, communication interfaces—e.g., a network interface or WLAN interface) and/or an evaluation unit (e.g., a processor) and/or a memory unit. By means of the interfaces, it is possible to exchange data (e.g., to receive, communicate, transmit or provide data). By means of an evaluation unit, it is possible to compare, validate, process, assign or calculate data in a computer-implemented and/or automated manner. By means of the memory unit, data can be stored, retrieved or provided in a computer-implemented and/or automated manner. It would also be possible that multiple modules are implemented by a common processor.

The term "include"—specifically with respect to data and/or information—can relate to a (computer-implemented) storing of respective information or the respective date in a data structure/data set (which, e.g., in turn is also stored in a memory unit) in the context of the present disclosure.

The term "assign"—specifically in relation to data and/or information—can relate to a computer-implemented assignment of data and/or information in connection with the present disclosure. For example, a first date is assigned, by means of a memory address or a unique identifier, a second date, e.g., by storing the first date together with the memory address or the unique identifier of the second date in a data set. This also pertains to data being "in association" with other data.

The term "providing"—in particular in regard to data and/or information—can relate to a computer-implemented providing in connection with the present disclosure. Said providing may be implemented by an interface, e.g., a database interface, a network interface, an interface to a memory unit. It is possible that respective data and/or information are communicated and/or transmitted and/or retrieved and/or received when providing via the interface.

The term "providing" can also relate to a loading or saving, e.g., of a transaction together with respective data in the context of the present disclosure. For example, this can be implemented on or by a memory module.

The term "providing" can also relate to communicating (or transmitting or receiving or transfer) of respective data from a node to another node of the blockchain or the (respectively of the corresponding infrastructure) in the context of the present disclosure.

A "smart-contract process" can refer to the execution of program code, e.g., of a control instruction, in a process by means of the DBS or the respective infrastructure.

A "checksum", e.g., a data-block checksum, a data checksum, a node checksum, a transaction checksum, a chaining checksum or the like can relate to a cryptographic checksum or a cryptographic hash or hash value, in the context of the present disclosure. Such checksums can, in particular, be determined across a data set and/or data and/or one or more transactions and/or a subsection of a data block, e.g., the block header of a block of the blockchain or the data block header of a data block of a DB S or only a part of the transaction of a data block. A checksum can be specifically implemented by a checksum or checksums or a hash value or hash values of a hash tree, e.g., a Merkle tree, a Patricia tree. Moreover, a "checksum" can also be implemented by a digital signature or a cryptographic message authentication code. By means of checksums, it is possible to implement cryptographic protection/protection against manipulation for transactions and the associated data and datasets on various levels of the DBS. For example, if there is a need for an increased level of security, it would be possible to create and validate checksums on transaction level. For example, if a reduced level of security is required, then it would be possible to create and validate checksums on block level—e.g., across the entire block or only across a part of the data block (e.g., sub-blocks) and/or a part of the transaction.

A "data-block checksum" can relate to a checksum which is calculated across a part or all transactions of a data block in the context of the present disclosure. A node can validate/determine the integrity/authenticity of the respective part of the data block by means of data-block checksums. Alternatively or additionally, the data-block checksum can also be formed across transactions of a preceding data block/predecessor data block. The data-block checksum can, in particular, be implemented by means of a hash tree, e.g., a Merkle tree [1] or a Patricia tree. Here, the data-block checksum can be the root checksum of the Merkle tree of the Patricia tree or of another binary hash tree. It would be possible that transactions are saved by means of further checksums from the Merkle tree or the Patricia tree, respectively, e.g., by using the transaction checksums, wherein in particular the further checksums can relate to leaves of the Merkle tree or the Patricia tree, respectively. The data-block checksum can, thereby, protect the transaction by forming the root checksum from the further checksums. The data-block checksum can, in particular, be calculated for the transactions of a specific data block of the data blocks. In particular, such a data-block checksum can be included in a subsequent data block of the given data block, e.g., to chain this subsequent data block with the preceding data blocks and, in particular to make the integrity of the DBS testable. Thereby, the data-block checksum can implement the chaining checksum or, at least, go into the chaining checksum. The header of a data block (e.g., of a new data block or a data block for which the data-block checksum is determined) can include the data-block checksum.

A "transaction checksum" can relate to a checksum which is determined across a transaction of a data block, in connection with the present disclosure. In addition, the calculation of the data-block checksum of a respective data block can be accelerated, because for this already calculated transactions checksums can be readily used as leaves of a Merkle tree.

A "chaining checksum" in the context of the present disclosure can relate to a checksum which for the respective data block of a DBS indicates or references to a preceding data block of the DBS—which is often referred to as "previous block hash" in literature [1]. For this, in particular, a respective chaining checksum is determined for the preceding data block. The chaining checksum can be implemented, e.g., by a transaction checksum or a data-block checksum of a data block, i.e., of an existing data block of the DBS; to thereby chain a new data block with a (existing) data block of the DBS. For example, it would also be possible that a checksum is determined across a header of the preceding data block or across the entire preceding data block to be used as a chaining checksum. For example, this could also be calculated for multiple or all of the preceding data blocks. For example, the chaining checksum could also be implemented by a checksum determined across the header of a data block in the data-block checksum. A respective data block of the DBS includes, however, a chaining checksum that has been calculated or relates to a preceding data block, specifically, the next-neighbor preceding data block directly adjacent to the respective data block. For example, it would also be possible that a respective chaining checksum is determined only across a part of the respective data block, e.g., the preceding data block. Thereby, a data block can be implemented which has an integrity protected part and a non-protected part. Thereby, a data block can be implemented that has a non-changeable integrity protected part and that has a non-protected part that can be modified later on. Integrity protected can mean that a change of the integrity protected data can be detected by means of a checksum.

Next, example implementations of a transaction are described.

The data—that is, e.g., stored in a transaction of a data block—can be provided in various manners. Instead of data—e.g., user data such as measurement data or data/ownership structure regarding ASICs—a transaction of a data block can rather include the checksum for such data. The respective checksum can be implemented in various manners. For example, a respective data-block checksum of a data block, e.g., including the respective data, of another database or of the distributed ledger, a transaction checksum of a data block of the respective data, e.g., of the distributed ledger or of another database, or a data checksum determined across the data can be used.

In addition, the respective transaction can optionally include a link to or an indication of a memory position—e.g., an address of a file server and indications where the respective data are to be found on the file server; or an address of another distributed ledger which includes the data. The respective data could, e.g., also be provided in a further transaction of a further data block of the distributed ledger—e.g., if the respective data and the associated checksums are included in different data blocks. It would also be possible that those data are provided via another communication channel—e.g., via another database and/or a cryptographically-secured communication channel.

Further, it would be possible that in addition to the checksum an add-on data set—e.g., a link or an indication to a memory position—is provided in the respective transaction. The add-on data set can, in particular, indicate where the data can be retrieved. This can be helpful to limit the amount of data of the blockchain or of the distributed ledger.

The term "security protected" can, specifically, relate to a protection that can be implemented by a cryptographic method. For example, this can be implemented by using a DBS for the providing or communication or transmitting of respective data/transactions. This can be implemented by a combination of the various checksums—e.g., cryptographic—, by appropriate synergetic interaction between the checksums, to, e.g., increase the security or the cryptographic security for the data of the transactions. In other words, "security protected" in the context of the present disclosure can also relate to "cryptographically protected" and/or "protected against manipulation", wherein "protected against manipulation" can also be referred to as "protected integrity".

Insertion of transactions into a distributed ledger can include chaining of data blocks of a distributed ledger. The term "chaining of data blocks of a distributed ledger" in the connection of the present disclosure can relate to the data blocks respectively including information (such as the chaining checksum) which links to another data block or multiple other data blocks of the distributed ledger [1], [4], [5].

Insertion of transactions into a distributed ledger can include saving/storing the transactions in one or more data blocks of the distributed ledger.

Insertion of transactions can include validating and/or confirming transactions.

The term "insertion of transactions into the distributed ledger" and the like (specifically, storing a transaction in a distributed ledger) can relate to communicating a transaction or transactions or a data block including the transactions to one or more nodes of a DBS. If those transactions are successfully validated, e.g., by means of the one or more nodes, these transactions can be chained as a new data block with at least one existing data block of the distributed ledger [1], [4], [5]. For this, the respective transactions are stored in a new data block. In particular, this validating and/or chaining can be implemented by a trusted node, e.g., a mining node, a blockchain oracle or a blockchain platform.

In particular, a blockchain can relate to a blockchain as a service, such as has been proposed by Microsoft or IBM. In particular, trusted nodes and/or other nodes can deposit a node checksum, e.g., a digital signature, in a data block, e.g., in a data block that has been validated by the respective node and which is then chained, in particular to facilitate identification of the creator of the data block and/or identification of the node. Here, the node checksum indicates which node has chained the respective data block with at least one other data block of the distributed ledger.

A "transaction" or "transactions" in connection with the present disclosure can relate to a smart contract [4], [5], a data structure or a transaction data set, which, in particular, respectively include a transaction or multiple transactions. The term "transaction" or "transactions" can also relate to the data of a transaction of a data block of a blockchain, in connection with the present disclosure. A transaction can, e.g., include a program code which, e.g., implements a smart contract. For example, a transaction can also relate to a control transaction and/or a confirmation transaction in the context of the present disclosure. Alternative, a transaction can also be implemented by a data structure which saves the data (e.g., the control instructions and/or the contract data and/or other data such as video data, user data, measurement data etc.).

In particular, the term "saving transactions in data blocks", "saving transaction" and the like can relate to a direct saving or indirect saving. A direct saving can relate to the respective data block of the distributed ledger or the respective transaction of the distributed ledger including the respective data. An indirect saving can relate to the respective data block or the respective transaction including a checksum and, optionally, an add-on data set, e.g., a link to or an indication of a memory location for respective data; hence, the respective data are not directly saved in the data block (or the transaction). Rather, a checksum is provided for these data in the data block. In particular, these checksums can be validated when saving transactions in data blocks, such as has been explained above with respect to "inserting into the distributed ledger".

A "program code"—such as a smart contract—can relate to a program instruction or multiple program instructions which are saved in one or more transactions, in connection with the present disclosure. The program code can be executable and can be executed, e.g., by the DBS. This can be implemented, e.g., by a runtime environment, e.g., of a virtual machine, wherein the runtime environment or the program code are Turing complete. The program code is executed by the infrastructure of the DBS [4], [5]. Here, a virtual machine is implemented by the infrastructure of the DBS. It is possible to execute the program code when validating a corresponding transaction.

A "smart contract" can relate to an executable program code in connection with the present disclosure [4], [5]—see, in particular, explanations with respect to "program code" provided above. The smart contract is saved in a transaction of the distributed ledger—e.g., a blockchain—, e.g., in a data block of the distributed ledger. For example, the smart contract can be executed in the same manner as has been described in connection with the definition of "program code", in particular in connection with the subject disclosure.

The term "proof of work" can relate to solving a computationally expensive task, in particular, depending on the content of a data block or the content of a specific transaction, in connection with the present disclosure [1], [4], [5]. Such a computationally expensive task can also be referred to as cryptographic puzzle.

The term "distributed ledger", which can also be referred to simply as "distributed database", can generally relate to a decentralized, distributed database, a blockchain, a distributed memory system, a distributed ledger technology (DLT) based system (DLTS), a revision secure database system, a cloud, a cloud-service, a blockchain in a cloud or a peer-to-peer database system, in the context of the present disclosure. Also, various implementations of a blockchain or of a DLTS can be used, e.g., such as a blockchain or a DLTS that is implemented by means of a directed acyclic graph (DAG), a cryptographic puzzle, a hash graph or a combination of these variants [6], [7]. It would also be possible to implement different consensus algorithms. For example, a consensus algorithm can be implemented by means of a cryptographic puzzle, a gossip about gossip, a virtual voting or a combination of such techniques (e.g., gossip about gossip combined with virtual voting) [6], [7]. For example, if a blockchain is used, then this can, in particular, be implemented by a bitcoin-based implementation or an Ethereum-based implementation [1], [4], [5]. The term "distributed database" can also relate to a DBS that has at least a part of its nodes and/or devices and/or infrastructure implemented by a cloud. For example, the respective components can be implemented as nodes/devices in the cloud (e.g., as virtual nodes in a virtual machine). This can be implemented by WMware, Amazon web services or Microsoft Azure. Due to the increased flexibility of the described implementation scenarios, it is, in particular, possible to combine partial aspects of the described implementation scenarios with each other, e.g., by using a hash graph as blockchain, wherein the blockchain itself can also be a block batch.

For example, if a directed acyclic graph (DAG) is used (e.g., IOTA or Tangle), transactions or blocks or nodes of the graph are connected with each other via directed edges. I.e., (all) edges are (always) having the same direction, e.g., as observed for time. In other words it is, in particular, not possible to propagate through or visit transactions or blocks or nodes of the graph backwards (i.e., opposite to the common unified direction). Acyclic means, in particular, that there are no loops or ring closures when traversing the graph. For example, a distributed ledger can relate to a public distributed ledger (e.g., a public blockchain) or a closed (private) distributed databased system (e.g., a private blockchain).

For example, in the case of a public distributed ledger, the nodes and/or devices can join the DBS without proof of authorization or authentication or login credentials, respectively be accepted by the DBS without such information. In particular, in such a case the operator of the nodes and/or devices can remain anonymous.

For example, in the case of implementation of the distributed ledger by a closed database system, new nodes and/or devices can require a valid proof of authorization and/or valid authentication information and/or valid credentials and/or valid login information to join the DBS or be accepted by the DBS. A respective consortium of parties may require consensus for accepting a new party.

A DBS can also be implemented by a distributed communication system for data exchange. For example, this can be a network or a peer-to-peer network.

The term "data block"—that can be, depending on the context and implementation, also be referred to as "constituent" or "block"—can refer to, in the context of the present disclosure, a data block of a distributed ledger—e.g., a blockchain or a peer-to-peer database—, which are, in particular, implemented as a data structure and include one of the transactions or multiple of the transactions. In an implementation, the database or the database system can be a DLT based system (DLTS) or a blockchain and the data block can be a block of the blockchain or of the DLTS.

As a general rule, a data block can, e.g., include indications of the size—e.g., data volume in bytes—of the data block, a data block header (block header), a transaction counter and one or more transactions [1]. The data block header can include a version, a chaining checksum, a data-block checksum, a timestamp, a proof of work, a Nonce—i.e., a unique value, a random value or a counter which is used for the proof of work [1], [4], [5]. A data block can, e.g., also simply relate to a respective memory range or address range of the overall data that is stored in the DBS. Thereby, it is possible to implement blockless DBS such as the IOT chain (ITCA), IOTA, Byteball, etc. Here, the functionality of the blocks of a blockchain and of the transactions are combined with each other in such a manner that, e.g., the transactions themselves secure the sequence or chains of transactions of the distributed ledger, such that they are, in particular, saved in a secured manner. For this the transactions can be chained by means of a chaining checksum, e.g., by using a separate checksum or the transaction checksum of one or more transactions as chaining checksum, which is saved in a new transaction in the distributed ledger when storing the new transaction in the distributed ledger. In such a scenario, a data block can, e.g., also include one or more transactions, wherein in a simple scenario a data block relates to a single transaction.

The term "Nonce" can relate to, in connection with the present disclosure, a cryptographic nonce—which is an abbreviation for "used only once" [2] or "number used once" [3]. In particular, a Nonce indicates individual numbers or a combination of letters that is only used once in the respective context, e.g., transaction, data communication.

The term "preceding data blocks of a (given) data block of the distributed ledger" can relate, in connection with the present disclosure, e.g., to the data block of the distributed ledger that is a direct predecessor of the (given) data block. Alternatively, the term "preceding data blocks of a (given) data block of the distributed ledger" can also relate to all data blocks of the DBS that precede the given data block. Thereby, the chaining checksum or the transaction checksum can be determined across the direct preceding data block (respectively the transactions thereof) or all data blocks preceding the given data block (respectively the respective transactions).

The terms "blockchain node", "node", "node of a DBS" and the like can relate, in the context of the present disclosure, to devices—e.g., mobile devices, wireless communication devices, computers, smartphones, clients or participants—that perform operations associated with the distributed ledger, e.g., a blockchain [1], [4], [5]. Such nodes can, e.g., execute transactions of a distributed ledger or the respective data blocks or can insert new data blocks including new transactions into the distributed ledger by means of new data blocks. In particular, this validation and/or chaining can be implemented by a trusted node, e.g., a mining node, or exclusively by trusted nodes. A trusted node is a node that has additional security measures—e.g., firewalls, access restrictions to the node or the like—to avoid manipulation of the node. Alternatively or additionally, a trusted node can, e.g., save a node checksum—e.g., a digital signature or a certificate—in the new data block when chaining the new data block with the distributed ledger. Thereby, it is possible to provide the proof that indicates that the respective data block has been inserted by a specific node, respectively indicate the originator.

As a general rule, device or the devices can be implemented by devices of a technical system and/or an industrial plant and/or an automation network and/or a fabrication plant, that can also be nodes of the DBS. Thereby, the devices can be mobile devices or devices of the Internet of things, that can also be nodes of the DBS. Nodes can, e.g., include at least one processor, e.g., to execute their computer-implemented functionality.

The term "blockchain oracle" and the like can relate, in the context of the present disclosure, to nodes, devices or computers that include a security module that has software protection mechanisms—e.g., cryptographic methods—, mechanical protection mechanisms—e.g., a lockable housing—or electric protection measures—e.g., tamper protection or a protection system that deletes data of the security module in the case of unauthorized use/modification of the blockchain oracle. The security module can include, e.g., cryptographic keys that are required for the calculation of checksums—e.g., of transaction checksums or node checksums.

The term "computer" or "device" can relate to a computer (system), a client, a smartphone, a device or a server that are arranged outside of the blockchain, respectively or are not participants of the DBS, i.e., do not execute operations of the DBS or simply retrieve those without executing transactions, inserting data blocks or calculate proof of works. Alternatively, the term "computer" or "device" can also relate to a node of the DBS. In other words, a device can in particular implement a node of the DBS or a device outside of the blockchain and the DBS, respectively. A device outside of the DBS can, e.g., access the data—e.g., the transactions or the control transactions—of the DBS. A device outside of the DBS can be controlled by nodes—e.g., by means of smart contracts and/or blockchain oracles. For example, if a control of a device—e.g., a device implemented as a node or a device outside of the DBS—is implemented by a node, then this can occur via a smart contract which, in particular, is saved in a transaction of the DBS.

Embodiments of the invention include a computer-implemented method of operating a node of a network of nodes that is maintaining a distributed ledger of smart contracts amongst a consortium of parties, and a computer program product, comprising a computer readable hardware storage device having computer readable program code stored therein, said program code executable by a processor of a computer system to implement the computer-implemented method. Further, embodiments include a node of a network of nodes that is configured for maintaining a distributed ledger of smart contracts amongst a consortium of parties.

It is to be understood that the features mentioned above and those yet to be explained below may be used not only in the respective combinations indicated, but also in other combinations or in isolation without departing from the scope of embodiments of the invention.

BRIEF DESCRIPTION

Some of the embodiments will be described in detail, with reference to the following figures, wherein like designations denote like members, wherein.

DETAILED DESCRIPTION

Some examples of the present disclosure generally provide for a plurality of circuits or other electrical devices. All references to the circuits and other electrical devices and the functionality provided by each are not intended to be limited to encompassing only what is illustrated and described herein. While particular labels may be assigned to the various circuits or other electrical devices disclosed, such labels are not intended to limit the scope of operation for the circuits and the other electrical devices. Such circuits and other electrical devices may be combined with each other and/or separated in any manner based on the particular type of electrical implementation that is desired. It is recognized that any circuit or other electrical device disclosed herein may include any number of microcontrollers, a graphics processor unit (GPU), integrated circuits, memory devices (e.g., FLASH, random access memory (RAM), read only memory (ROM), electrically programmable read only memory (EPROM), electrically erasable programmable read only memory (EEPROM), or other suitable variants thereof), and software which co-act with one another to perform operation(s) disclosed herein. In addition, any one or more of the electrical devices may be configured to execute a program code that is embodied in a non-transitory computer readable medium programmed to perform any number of the functions as disclosed.

In the following, embodiments of the invention will be described in detail with reference to the accompanying drawings. It is to be understood that the following description of embodiments is not to be taken in a limiting sense. The scope of embodiments of the invention are not intended to be limited by the embodiments described hereinafter or by the drawings, which are taken to be illustrative only.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Hereinafter, techniques will be disclosed that pertain to operating nodes of a network of nodes that forms a DBS. The network of nodes maintains a distributed ledger. The distributed ledger can be implemented by a blockchain. In such case, the network can be referred to as blockchain network. For sake of simplicity, various examples will be disclosed hereinafter with respect to an implementation of the distributed ledger by a blockchain; however, respective techniques may be readily applied to other kinds and types of implementation of the distributed ledger, different than a blockchain.

According to various examples, a blockchain application can be facilitated by the network of nodes. The blockchain application may define interaction between multiple parties. The multiple parties can form a consortium.

To give a few examples, it would be possible that the multiple parties pertain to different suppliers along a supply chain, e.g., a food supply chain. The multiple parties could pertain to different machines or automated equipment in an industrial manufacturing process.

The nodes operate according to predetermined policies when maintaining the blockchain. A respective protocol may be implemented by the nodes. Specifically, it would be possible that the nodes of the network take into account data retention rules. Such data retention rules can specify circumstances under which parties of the consortium are allowed to leave the consortium along with deleting respective transactions from the blockchain.

Figure 1:
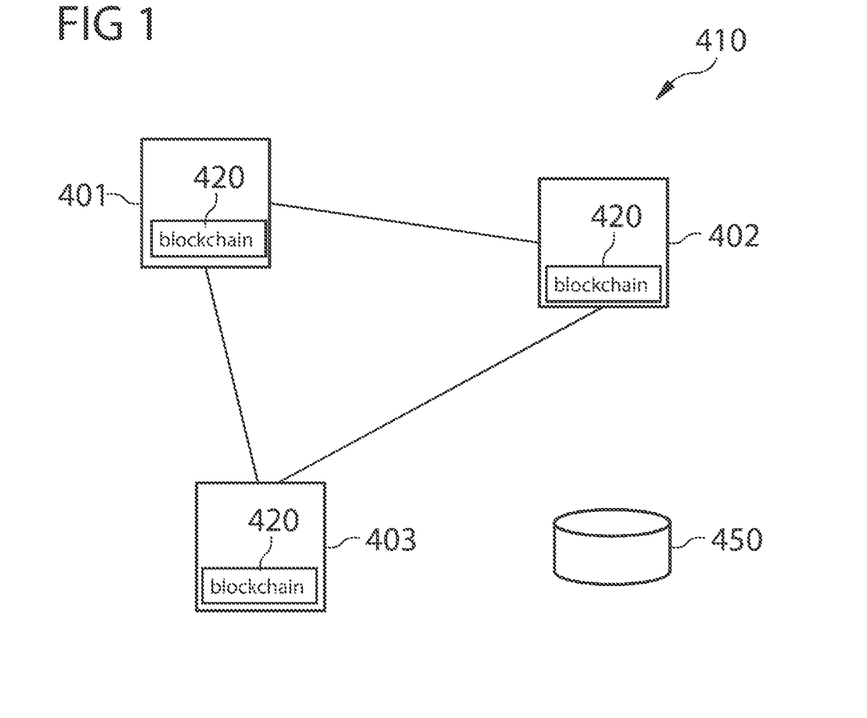
FIG. 1 schematically illustrates a network of multiple nodes according to various examples, the network maintaining a distributed ledger.

FIG. 1 schematically illustrates a network 410 of multiple nodes 401-403. Each node 401-403 stores a respective copy of a blockchain 420. Accordingly, the network 410 maintains the blockchain 420. The nodes 401-403 form a DBS.

The blockchain 420 is generally associated with smart contracts amongst the consortium of parties that participates in a blockchain application and operates the nodes 401-403. Typically, each party of the consortium operates a respective node 401-403.

The network 410 may also include one or more non-distributed databases 450, for off-chain storage, e.g., of payload data (i.e., large application-level data). It would be possible that each node 401-403 has a respective non-distributed database (not shown).

Figure 2:
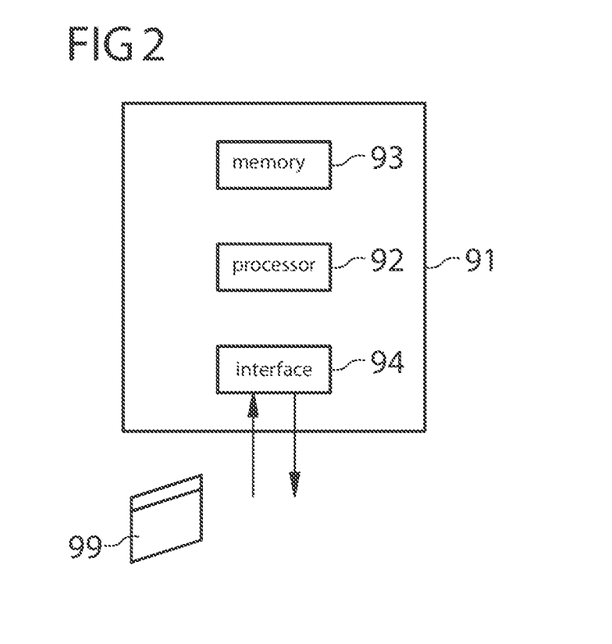
FIG. 2 schematically illustrates a node of the network of FIG. 1 in further detail according to various examples.

FIG. 2 schematically illustrates a node 91. The node 91 could, e.g., implement any one of nodes 401-403 of the network 410 of the example of FIG. 1.

The node 91 includes a processor 92 and a memory 93 and a communication interface 94. The processor 92 can receive data via the communication interface 94 and can transmit data via the interface 94, e.g., to other nodes. For instance, the processor 92 could receive a query to store a transaction and the associated transaction 99 via the communication interface 94. The processor 92 could output a result of a verification task of a transaction via the communication interface 94. The correctness of a smart contract can be validated.

The processor 92 can load program code from the memory 93 and can then execute the program code. Upon loading the program code, the processor 92 can perform techniques as disclosed herein, e.g., with respect to storing one or more transactions in the blockchain 420, storing, in association with the one or more transactions, one or more identifiers of the owners of the one or more smart contracts that are associated with the one or more transactions that are stored in the blockchain 420; obtaining and processing a withdrawal request of a given party for leaving the consortium; deleting transactions associated with a given party as the owner from the blockchain 420; etc.

Details with respect to the operation of the node 91, specifically the processor 92, will be explained in connection with FIG. 3, FIG. 4 in FIG. 5, hereinafter.

Figure 3:
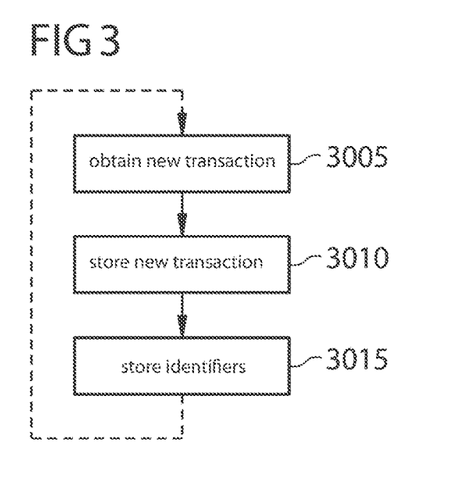
FIG. 3 is a flowchart of a method according to various examples.

FIG. 3 is a flowchart of a method according to various examples. The flowchart of FIG. 3 could be executed by a node of a network of nodes that is maintaining a distributed ledger such as the blockchain 420. For instance, the method of FIG. 3 could be executed by any one of nodes 401-403 of the network 410 of FIG. 1. More specifically, it would be possible that the method according to FIG. 3 is executed by the processor 92 upon loading and executing program code from the memory 93, cf. FIG. 2.

Prior to executing the method of FIG. 3, the blockchain can be instantiated. For this, genesis data can be replicated across all nodes of the network.

FIG. 3 illustrates a method that pertains to storing one or more transactions in the blockchain. These one or more transactions are associated with smart contracts amongst a consortium of multiple parties. As such, the one or more transactions can be associated with a blockchain application that is executed by the parties of the consortium.

At box 3005, a new transaction or multiple new transactions that are associated with one or more smart contracts are obtained. For instance, a respective query for storage in the blockchain may be obtained from a blockchain client.

Each smart contract is associated with a respective owner selected from the parties of the consortium.

At box 3010, the one or more transactions that are obtained at box 3005 are stored in the blockchain. For instance, one or more blocks can be chained to the blockchain.

At box 3015, one or more identifiers of the owners of the one or more smart contracts that are associated with the one or more transactions that are stored in box 3010 are stored in the blockchain in association with the one or more transactions. Each smart contract can be annotated with a respective owner. These identifiers can include unique identities of the respective party.

As a general rule, various options are available for storing such one or more identifiers in association with the one or more transactions. To give a few examples, it would be possible to store each transaction in immediate succession with an associated identifier. It would be possible that the identifiers include pointers towards the respective transactions. It would also be possible that associated identifiers and transactions are included in a common data structure, e.g., a common block or sub-block of the blockchain. An example implementation of a respective structure of entries of the blockchain 420 is illustrated in FIG. 4.

Figure 4:
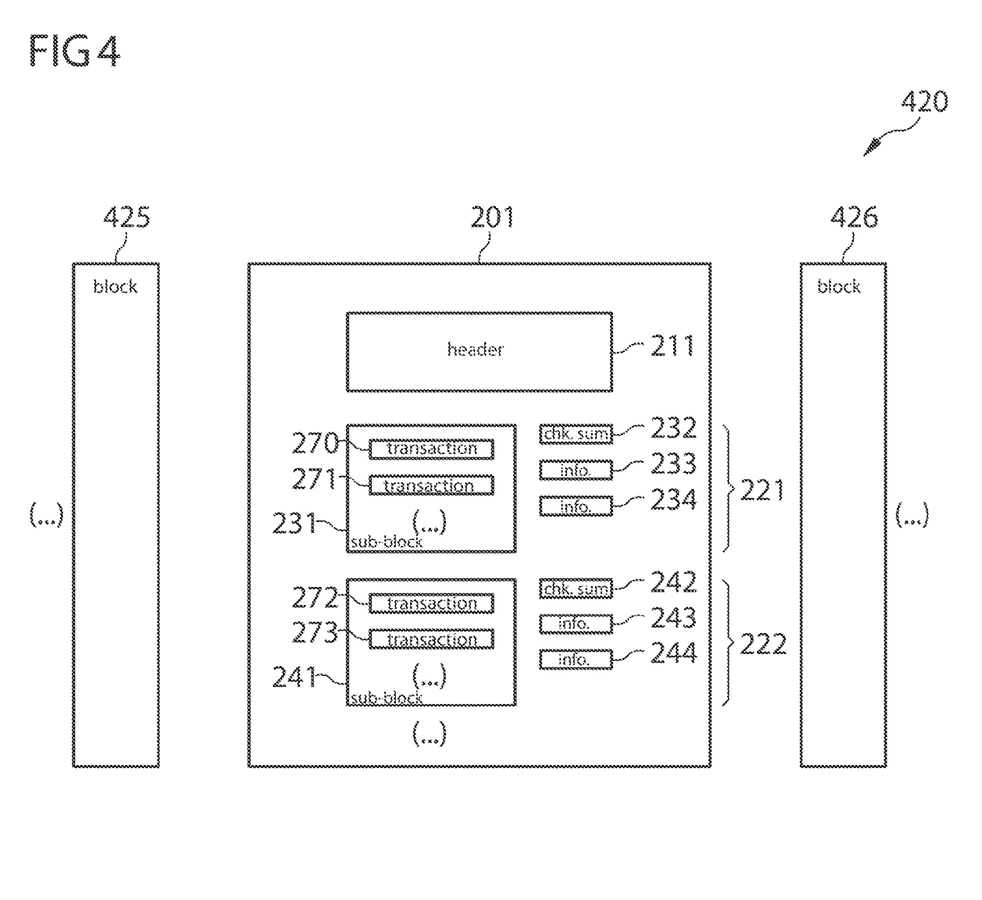
FIG. 4 schematically illustrates a data structure of the distributed ledger according to various examples.

FIG. 4 schematically illustrates a block 201 of a blockchain 420.

The block 201 includes a header 211. The header 211 includes metadata. Such metadata can include a checksum (e.g., a hash value) of the preceding block 425 of the blockchain 420. The metadata can include a pointer to the preceding block 425 (also illustrated is a subsequent block 426).

The header 211 can also include a checksum of the current block 201. Such has checksum could be, in particular, determined across multiple sub-blocks 231, 241 of the block 201 (while in FIG. 4 only two sub-blocks 231, 241 are illustrated, as a general rule, the block 201 can include more than two sub-blocks and, in principle, could also include only a single sub-block).

Each sub-block 231, 241 includes one or more transactions 270, 271, 272, 273.

For instance, it would be possible that the transactions inside sub-blocks are ordered based on their timestamps.

By using multiple sub-blocks 231, 241, the blockchain is partitioned into multiple data structures, i.e., the sub-blocks 231, 241. This partitioning of the blockchain 420 is in accordance with owners of the smart contracts underlying the transactions. In other words, each one of the sub-blocks 231, 241 is associated with a respective party of the consortium. Then, different transactions 270, 271, 272, 273 are stored in the particular sub-block 231, 241 depending on the respective owner.

Furthermore, for each sub-block 231, 241, a respective check sum 232, 242 is determined and stored in association with that sub-block 231, 241.

As illustrated in FIG. 4, it is possible that further information 233-234, 243-244 is stored in association with the sub-blocks 231, 241. Specifically, it would be possible that a respective identifier 233, 243 of the owner of the respective transactions 270-273 of that sub-block 231, 241 is stored in association with those sub-blocks 231, 241. I.e., the party that owns the transactions 270-273 in each sub-block 231, 241 can be identified. Alternatively or additionally, it is possible to store, in association with the transactions 270-273, respective data retention rules 234, 244. These data retention rules 234, 244 identify consensus requirements amongst the parties of the consortium for accepting withdrawal requests from the parties for leaving the consortium. The consensus requirement could specify whether a unanimous decision is required for a party leaving the consortium. A majority required to allow a party to leave the consortium may be specified. A polling mode may be specified. In the illustrated scenario of FIG. 4, these data retention rules 234, 244 are stored in the blockchain (which is generally optional). The data retention rules 234, 244 could be associated with a governance smart contract. I.e., the data retention rules 234, 244 could be treated as transactions associated with this governance smart contract. As a general rule, the data retention rules 234, 244 could also be stored elsewhere, e.g., in the off-chain database 450.

As a general rule, each smart contract can be associated with a respective consensus requirement amongst the parties of the consortium; here, for each transaction a respective data retention rule 234, 244 may be stored. Thus, even for a given party being owner of multiple smart contracts and is associated transactions, multiple data retention rules can be used.

Further, it would be possible that multiple data retention rules are associated with different ones of the parties. I.e., different data retention rules can apply to different parties.

For instance, each time a new smart contract is deployed, i.e., each time a transaction associated with the new smart contract is stored in the blockchain 420, a new data retention rule may be stored.

As will be appreciated from FIG. 4, the transactions 270-274 are grouped in accordance with the identifiers 233, 243. All transactions 270-271 and 272-273 from the same owner are grouped together into a respective sub-block 231, 241; then, the sub-blocks 231, 241 are added to a common block 201 (or multiple continuous blocks of the blockchain).

Together with the additional information 232-234, 242-244, this forms sections 221, 222 associated with the respective parties that own the respective transactions 270-271 and 272-273, respectively.

To structure based on the owning parties, there are in particular the following two possibilities: firstly, all transactions for which a respective storage query is obtained (cf. FIG. 3: box 3005) belong to the same owner. Then, all these transactions are bonded into a single sub-block which is added to a block of the blockchain or multiple continuous blocks of the blockchain. Secondly, if a query for storage of multiple transactions that belong to different parties/owners is obtained (cf. FIG. 3: box 3005), then the transactions associated with each one of the multiple owners are grouped together in a respective sub-block. Each sub-block then includes transactions associated with a single owner, i.e., sharing the same identifier 233, 243.

Such structure of the blockchain 420 including the party-specific sections 221, 222 makes it possible to facilitate removal of transactions 270-273 from the blockchain 420 upon obtaining a withdrawal request from a party intending to leave the consortium. Aspects associated with such deletion of transactions are illustrated in connection with FIG. 5.

Figure 5:
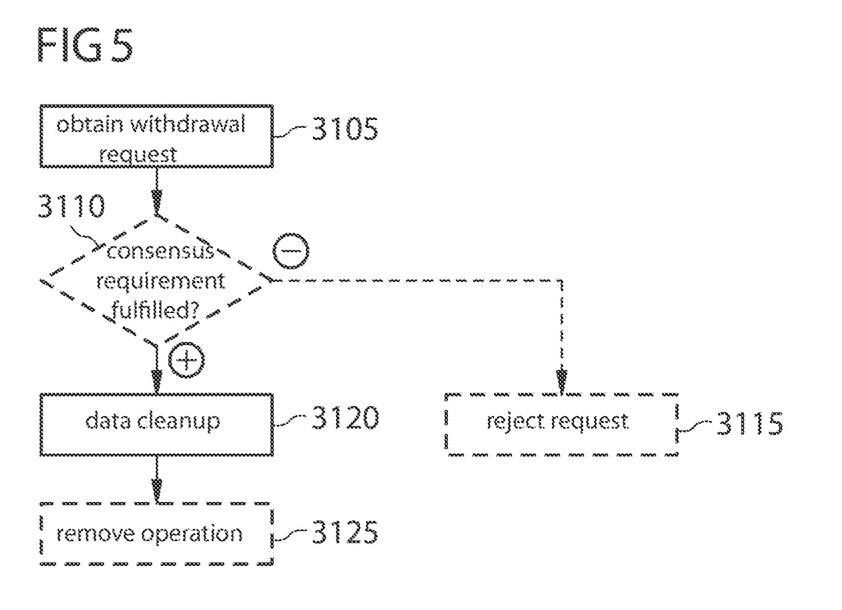
FIG. 5 is a flowchart of a method according to various examples.

FIG. 5 illustrates a method that pertains to deleting one or more transactions from a blockchain. These one or more transactions are associated with smart contracts that are associated with a given owner that intends to leave the consortium. The method of FIG. 5 can build upon the method of FIG. 3.

Optional boxes are labeled with dashed lines.

At box 3105, a withdrawal request is obtained from a given party of the plurality of parties. The withdrawal request indicates the intent of that given party to leave the consortium. The withdrawal request can be triggered by the given party, e.g., by a respective blockchain client.

For instance, the withdrawal request could be obtained from an application client of the given party that intends to leave the consortium. The withdrawal request can be accompanied by the explicit or implicit indication of the request to delete transactions and/or other data associated with the party intending to leave the consortium.

At optional box 3110, it would be possible to determine whether a consensus requirement or multiple consensus requirements for accepting such withdrawal request are fulfilled amongst the parties of the consortium. As has been explained above in connection with FIG. 4, it would be possible that respective data retention rules 234, 244 are stored in association with the respective transactions 270-273. They may be stored in the form of transactions of a governance smart contract; then, the governance smart contract can be triggered by the given party intending to leave the consortium.

Accordingly, be possible to test whether the respective consensus requirements specified by these data retention rules 234, 244 are met amongst the parties of the consortium. This can include polling for the respective consensus.

The data retention rules can, as a general rule, specify which parties need to vote before a given party can leave the consortium. The voting/polling modalities can be specified by the data retention rules. Voting rights can be specified. This ensures that a given party can't leave in a malicious manner. For instance, only if all the remaining parties agree and approve (or a subset that may be specified by the data retention rules, e.g., by means of voting rights), the given party may have the right to leave.

As a general rule, when a given party intends to leave the consortium, there may be multiple different data retention rules associated with multiple different transactions and underlying smart contracts applicable. In that sense, the decision made at box 3110 can be taken multiple times for different transactions (not illustrated in FIG. 5 for sake of simplicity).

In case the required consensus is not reached, then the removal requests can be rejected at box 3115. Else, the method can commence at box 3120. Here, a data cleanup of data associated with the leaving party is triggered.

At box 3120, it is possible to delete, from the blockchain and based on the respective identifiers stored in association with the transactions and identifying the owners of the respective smart contracts, all transactions that are associated with the given party that intends to leave the consortium as owner.

For instance, in a blockchain implementation of a distributed ledger, the latest block with a sub-block owned by the leaving party is identified. All transactions from that specific sub-block are deleted, whereas the checksum of that sub-block is retained. That way all has values of the blocks and sub-blocks are kept intact for later verification purposes. Then the blockchain is traversed back based on the previous block link from the header 211 until a new block with sub-block owned by the leaving party is identified. This process repeats until there are no older blocks that include a sub-block owned by the leaving party.

The operation that was performed in the transaction is also removed from the logs. This could pertain to deleting off-chain data, cf. box 3125. This means that it would be possible delete any off-chain data, specifically payload data, that is associated with the transactions that are deleted from the blockchain 420.

By means of boxes 3120, 3125, the footprint of the leaving party is deleted and the possibility that the current state of the removed data can be reconstructed following the transaction history is prevented.

As a general rule, it would be possible to perform a lookup of sub-blocks 231, 241 associated with the given party that intends to leave the consortium and delete the sub blocks 231, 241 that are associated with that given party. At the same time, the checksums 232, 242 may be retained. This would enable subsequent verification of the integrity of the distributed ledger 420, e.g., by performing checks on the checksum in a preceding or subsequent block of the blockchain.

As a general rule, a smart contract may have an associated party defined as owner. The smart contract may also be associated with one or more counterparties. For instance, such one or more counterparties can also sign the transaction. These one or more counterparties are, however, not the owner of that smart contract or the transaction derived from the smart contract.

A situation can arise where a given party intends to leave the consortium that has acted as counterparty in one or more transactions. In such a case, it would be possible that these transactions associated with such party have not been signed by the party itself, but by a agent on behalf of that party. The agent may be a consortium leader of the consortium of parties. The agent may be a random party selected from the consortium, e.g., for each signing process. The agent may also be a central authority. The agent may be established by the parties of the consortium when operating the network of nodes. For instance, when a party participates in a smart contract, the party may be required to consent that it may potentially opt for leaving the consortium in the feature; then the agent may sign on behalf of that party. Then, at box 3125, upon obtaining the withdrawal request at box 3105 of such a party, it would be possible to maintain these transactions (because the owner has not left the consortium). On the other hand, since these transactions have been signed by the agent on behalf of the party that is leaving the consortium, the identity of the leaving party is not available in clear format (but is rather pseudonymized). It would be possible that a log is maintained at the agent, the log being associated with those transactions where the leaving party has acted as counterparty. This log can be indicative of the withdrawal request of that given party or, specifically, of the party having left the consortium. Alternatively or additionally, a pseudoanonymous identity of the leaving party may be maintained. Then, the agent may deny access to the log for any unauthorized other parties so that anonymity of the party that has left is maintained.

Summarizing, an operation protocol of nodes of a network of nodes that maintains a distributed ledger has been disclosed which enables parties (users and organizations) to leave the consortium under previously agreed conditions. At the same time, the security, verification, and immutability of the distributed ledger is not compromised. Techniques have been disclosed that enable a party that intends to leave the consortium to remove any off-chain data and/or trigger anonymity for transactions in which the leaving party has acted as counterparty to another owner and/or delete any transactions owned by the leaving party. The integrity of the data is not compromised. Data provenance is not compromised. Decentralized applications are enabled which fulfill regulatory requirements of data privacy. Data can be stored in a distributed ledger and later-on deleted if required. Thereby, widespread use of distributed ledgers in industry applications can be promoted. Aspects of the data structure of the distributed ledger have been disclosed that facilitate an efficient and secure way to delete transactions from the distributed ledger, e.g., using party-specific partitioning of the distributed ledger.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A computer-implemented method of operating a node of a network of nodes that is maintaining a distributed ledger of smart contracts amongst a consortium of parties, the method comprising:

obtaining one or more transactions associated with one or more smart contracts for storage in the distributed ledger, each smart contract of the one or more smart contracts being associated with a respective owner selected from the consortium of parties;

storing the one or more transactions in the distributed ledger;

storing, in association with the one or more transactions, one or more identifiers of the owners of the one or more smart contracts associated with the one or more transactions in the distributed ledger;

obtaining, from a given party of the consortium of parties, a withdrawal request for leaving the consortium; and upon obtaining the withdrawal request, deleting, from the distributed ledger and based on the one or more identifiers, any transaction associated with the given party as owner.

2. The computer-implemented method of claim 1, further comprising:

upon obtaining the withdrawal request, deleting, from a further database different than the distributed ledger, payload data associated with the transactions that are deleted from the distributed ledger.

3. The computer-implemented method of claim 1, wherein at least one transaction stored in the distributed ledger is associated with a further party as owner different than the given party, wherein the given party is a counterparty of the further party for the smart contract associated with the at least one transaction, wherein the at least one transaction is signed by an agent on behalf of the given party, wherein the method further comprises:

upon obtaining the withdrawal request, maintaining, at the agent, at least one of a log associated with the at least one transaction and indicative of the withdrawal request of the given party, or a pseudoanonymous identity of the given party and associated with the at least one transaction.

4. The computer-implemented method of claim 1, wherein the storing of the one or more transactions and of the one or more identifiers comprises:

partitioning the distributed ledger into multiple data structures associated with the parties of the consortium of parties, each one of the one or more transactions being stored in the respective data structure depending on the respective owner, and determining, for each data structure of the multiple data structures, a respective checksum and storing the respective checksum in the distributed ledger.

5. The computer-implemented method of claim 4, wherein the distributed ledger is a blockchain comprising multiple blocks, wherein the data structures are sub-blocks of the multiple blocks.

6. The computer-implemented method of claim 4, wherein the deleting of any transactions associated with the given party as owner comprises performing a look-up for data structures associated with the given party, deleting any data structure associated with the given party, and retaining, in the distributed ledger, respective checksums associated with any deleted data structure.

7. The computer-implemented method of claim 1, further comprising:

storing, in association with the one or more transactions, one or more data retention rules associated with the one or more smart contracts, the one or more data retention rules identifying consensus requirements amongst the consortium of parties for accepting withdrawal requests from parties of the consortium of parties for leaving the consortium.

8. The computer-implemented method of claim 7, wherein the one or more data retention rules are stored in the distributed ledger.

9. The computer-implemented method of claim 7, wherein the one or more data retention rules comprise multiple data retention rules associated with different parties of the consortium of parties.

10. The computer-implemented method of claim 7, wherein the one or more data retention rules comprise at least two data retention rules associated with a given party of the consortium of parties and different smart contracts.

11. A computer program product, comprising a computer readable hardware storage device having computer readable program code stored therein, said program code executable by a processor of a computer system to implement a method of claim 1.

12. A node of a network of nodes that is configured for maintaining a distributed ledger of smart contracts amongst a consortium of parties, the node comprising a at least one processor and a memory, the at least one processor being configured to load program code from the memory and execute the program code, wherein the at least one processor, upon executing the program code, is configured to:

obtain one or more transactions associated with one or more smart contracts for storage in the distributed ledger, each smart contract of the one or more smart contracts being associated with a respective owner selected from the consortium of parties, store the one or more transactions in the distributed ledger, store, in association with the one or more transactions, one or more identifiers of the owners of the one or more smart contracts associated with the one or more transactions in the distributed ledger;

obtain, from a given party of the consortium of parties, a withdrawal request for leaving the consortium; and upon obtaining the withdrawal request, delete, from the distributed ledger and based on the one or more identifiers, any transaction associated with the given party as owner.

* * * * *